Aug. 8, 1950 J. W. LOY 2,517,900
METHOD AND APPARATUS FOR LIQUID
PHASE HYDROCARBON CONVERSION
Filed Jan. 5, 1948 2 Sheets-Sheet 1

INVENTOR.
J. W. LOY
BY Hudson & Young
ATTORNEYS

Patented Aug. 8, 1950

2,517,900

UNITED STATES PATENT OFFICE 2,517,900

METHOD AND APPARATUS FOR LIQUID PHASE HYDROCARBON CONVERSION

John W. Loy, Woods Cross, Utah, assignor to Phillips Petroleum Company, a corporation of Delaware Application January 5, 1948, Serial No. 606

6 Claims. (Cl. 196—52)

This invention relates to a method and to an apparatus for conducting catalytic reactions at high pressure. In one specific embodiment it relates to an apparatus for continuously conducting catalytic hydrocarbon conversion reactions at high pressures. In another specific embodiment it relates to a means for more efficient stripping of adsorbed reaction products from the catalyst. In still another aspect of the invention it relates to a method for the stripping of hydrocarbons from a catalyst upon which said hydrocarbons have become adsorbed in a substantially liquid phase conversion of hydrocarbons.

In the prior art systems for the catalytic cracking of hydrocarbons have made use of fixed bed catalysts or a moving catalyst. In a fixed bed system, when it becomes necessary to regenerate the catalyst the reactor must be taken out of service and the regeneration process carried out. The moving catalyst systems offer the advantage that the process is continuous since a stream of catalyst is continuously withdrawn to be regenerated and returned to the system. These cracking systems operate generally at pressures below 100 p. s. i. g. although mention is made of operating at higher pressures.

In a catalytic cracking system operating in liquid phase at high pressures, the catalyst adsorbs liquid reaction products. If all of the adsorbed hydrocarbons must be removed in the regenerator there is grave danger that the catalyst will be ruined by the prolonged heating required. Therefore, it is desirable that this material be stripped from the catalyst before regeneration.

The principal object of my invention is to provide a moving catalyst system wherein hydrocarbon conversions can be carried out at pressures up to several thousand pounds per square inch.

Another object is to provide a system wherein catalytic hydrocarbon conversions can be carried out at high pressures and catalyst stripping and regeneration at low pressures.

Another object is to provide an improved catalyst stripping chamber for more efficient removal of adsorbed hydrocarbons from the catalyst.

A further object is to provide an improved method of handling catalysts.

Numerous other objects and advantages of my invention will be apparent to those skilled in the art upon reading the following specification, and accompanying drawings and claims. According to this invention there are provided a method and apparatus for conducting a high pressure, substantially liquid phase, hydrocarbon conversion in which a moving or fluidized particulate catalyst which adsorbs a substantial quantity of said hydrocarbons in the liquid phase is employed and must be regenerated. Thus, according to the invention the method comprises causing the liquid phase catalysis of the hydrocarbons to occur by maintaining the hydrocarbon under a pressure sufficient to form a body of liquid in a conversion zone, removing the converted hydrocarbon and catalyst fluid admixture from a low point of said zone and introducing said admixture into an intermediate point of a stripping zone maintained under a pressure substantially lower than the pressure in said conversion zone while introducing hydrocarbon gases and vapors from above said body of liquid in said conversion zone into the lower portion of said stripping zone; maintaining a level of stripped catalyst in the bottom of said stripping zone; and withdrawing said catalyst from said stripping zone at a point lower than said point in said stripping zone at which the said gases and vapors are introduced and passing it to a regeneration operation.

Apparatus suited to the application of the method of the invention and operation of said apparatus are fully described below.

Figure 1:
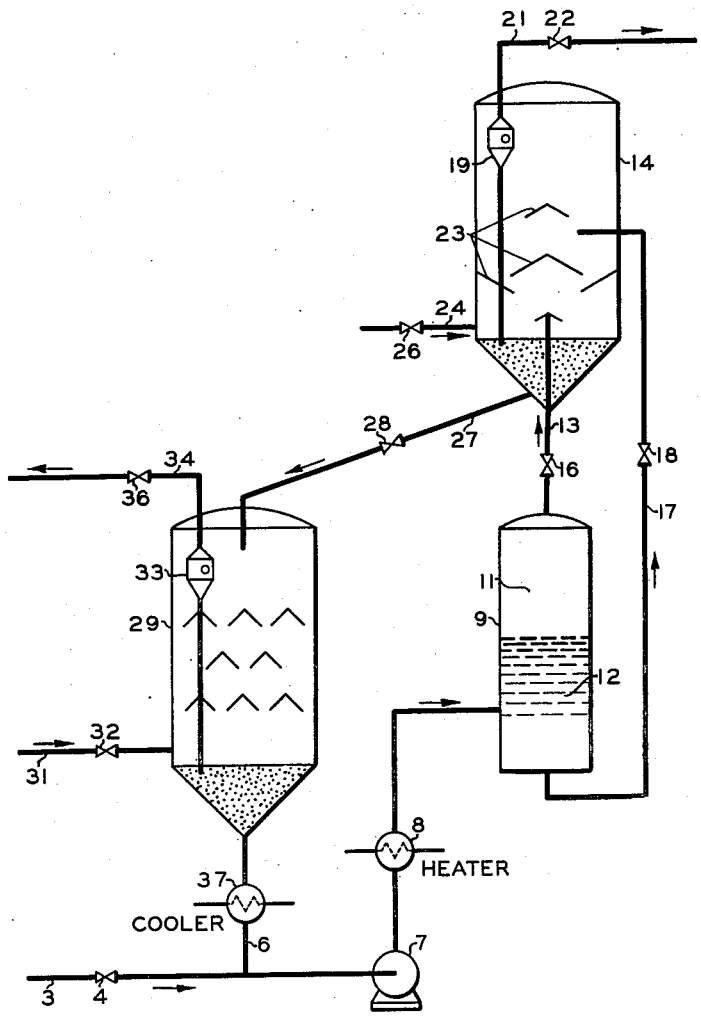
Figure 1 is an elevational view with parts in cross section of a reactant catalyst stripping chamber and catalyst regenerator embodying one form of my invention.

In Figure 1 the reactants flow from the source of supply through conduit 3 controlled by valve 4. The regenerated catalyst flows through catalyst conduit 6 into the reactant conduit 3 to pump 7 which thoroughly mixes the catalyst and reactants and delivers the mixture through heater 8 into reactor 9 under the desired pressure. The upper portion of the reactor is filled with reaction gases 11 and the lower portion of the reactor is filled with the liquid reaction mixture 12. The flow of reaction gases through conduit 13 into stripping chamber 14 is controlled by valve 16. The liquid reaction products with the suspended catalyst flows through line 17 controlled by valve 18 and is discharged into an upper portion of the catalyst stripping chamber, where flash distillation occurs. These gaseous products are removed from stripping chamber 14 through a cyclone separator 19 through conduit 21 controlled by valve 22. The catalyst falls through the stripping chamber over baffles 23 where it is contacted with hot gases entering the stripping chamber through conduit 13. A conduit 24 controlled by valve 26 is provided for introducing additional catalyst stripping gases. The catalyst outlet from the stripping chamber is in a position lower than the inlet for stripping gases. The catalyst will flow through catalyst conduit 27 controlled by valve 28 into the upper portion of catalyst regenerator 29. Regenerating gases are introduced, through conduit 31 controlled by valve 32, into a lower portion of the regenerator. Spent regenerating gases are removed through a cyclone separator 33 positioned in the upper portion of the catalyst regenerator and discharging to the outside through an exhaust vent 34 controlled by valve 36. A heat exchanger 37 positioned below the catalyst regenerator is used to cool the regenerated catalyst before introducing said catalyst back into the reactant conduit.

Figure 2:
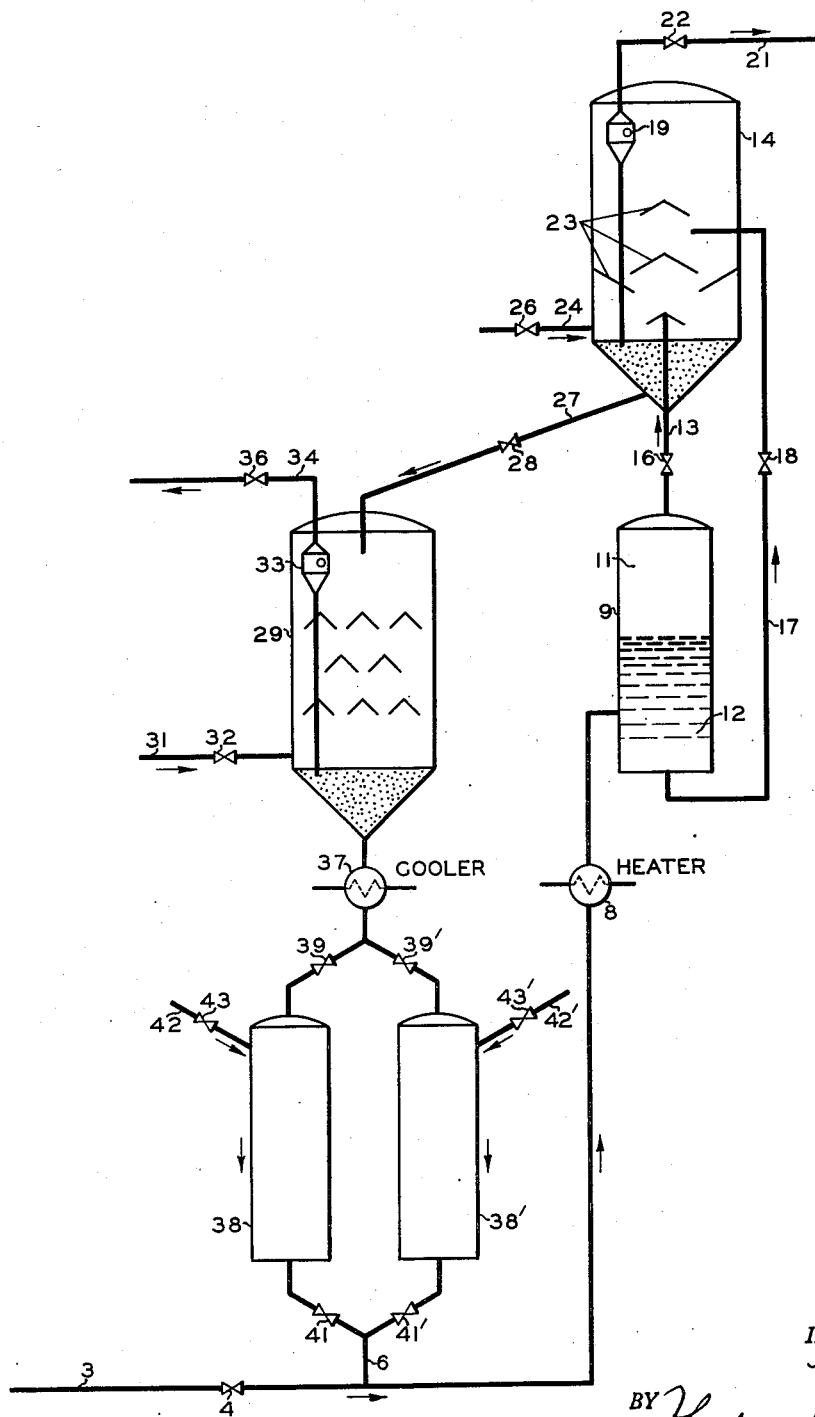
Figure 2 is a view similar to Figure 1 of a modified embodiment of my invention involving the feature of feeding the regenerated catalysts into the reactant line under pressure.

In Figure 2 the reactant hydrocarbons are supplied to the reactant conduit 3 at an elevated pressure, necessitating the use of a pair of seal feeders 38 and 38′ for introducing the regenerated catalyst into the reactant line. These seal feeders are arranged in parallel with separate influent control valves 39 and 39′ and effluent control valves 41 and 41′. Pressurizing gas is introduced into the seal feeders through lines 42 and 42′ controlled by valves 43 and 43′.

*Operation*

My invention is adapted to use in a wide variety of continuous catalytic conversion processes wherein a catalyst is used and a high reactor pressure is desirable, but it is primarily designed for hydrocarbon conversion processes such as catalytic cracking, isomerization, hydrogenation, alkylation, isoforming and reforming.

An important feature of my invention is the catalyst stripping zone wherein adsorbed hydrocarbons are stripped from the catalyst without the addition of steam or other diluent gases by using hot gaseous products from the reactor.

It is desirable that the amount of adsorbed hydrocarbons be as low as possible when the catalyst goes to the regenerator because part of these compounds will be burned to coke on the catalyst before they are volatilized. If the coke deposition is very high, prolonged heating at a high temperature is necessary to regenerate the catalyst. There is danger that the catalyst will be ruined by this.

In operating at high pressures and liquid phase, as in my invention, the material adsorbed by the catalyst will be heavy hydrocarbons and the amount adsorbed will be greater than for a vapor phase operation. If the catalyst is passed into the regenerator without stripping, these heavy hydrocarbons are cracked and coked before they are to be volatilized. The catalyst must then be subjected to rigorous oxidizing treatment to remove this coke.

At present, the conventional systems make use of air, hydrogen, or steam, usually steam, as a stripping gas. Any diluent gas thus added to the system, as a stripping agent must be first produced and later removed from the products. The amount of gas necessary to properly strip the catalyst used in a liquid phase system is considerable and its removal from the product adds another step to the process.

I use the gaseous reaction products from the reactor as a catalyst stripping gas. This gas is a mixture of the reaction products whose critical temperatures are lower than the temperature in the reactor. Thus, I use a gas already available at a high temperature and high pressure. This means that there is no generating equipment required and there is no separation problem.

In my invention I make use of a reaction chamber 9 built to withstand pressures as high as 5,000 pounds per square inch or higher. The reactants, which may be a mixture of hydrocarbons, are thoroughly mixed with a finely divided catalyst and the mixture is passed through a heater 8 into the reactor at high pressure. The rate of influent is controlled so that the reactor is substantially less than full of liquid reaction mixture, the space above the liquid 12 being filled with gaseous reaction products.

From the top of the reaction chamber 9 a conduit 13 leads to the bottom of the catalyst stripping chamber 14 positioned above and extends into the lower portion of said stripping chamber. A conduit 17 leads from the lower portion of the reactor to an upper portion of the catalyst stripping chamber and discharges therein. When the reaction mixture with suspended catalyst particles from the high pressure reactor is discharged into the stripping chamber the hydrocarbon reaction products are immediately vaporized and the catalyst falls to the bottom of the stripping chamber. In the upper portion of the catalyst stripping chamber is a cyclone separator 19 through which the gaseous reaction products are removed from the stripping chamber to an outside fractionating and separating system (not shown). The catalyst stripping chamber 14 operates at a pressure slightly greater than atmospheric. The catalyst falls over a series of baffles 23 and is contacted with the hot hydrocarbon gases entering below and is thereby stripped of the adsorbed heavy hydrocarbons. The intake catalyst conduit 27 is below the outlet of stripping gas conduit 13 so that the stripped catalyst particles are not disturbed by the incoming stripping gas.

The catalyst regenerator 29 is positioned below the stripping chamber so that the catalyst material will flow from the stripping chamber to the regenerator through a conduit 27 provided therefor. The catalyst is introduced into the regenerator in an upper portion. As it falls through the regenerator it is contacted by a stream of regenerating gases which enter through conduit 31. These regenerating gases are removed from the regenerator through a cyclone separator 33 and exhaust vent 34 in the upper portion.

The regenerated catalyst may or may not be cooled before it is added back to fresh hydrocarbon reactants. If the catalyst is added to the hydrocarbon reactants under pressure, a pair of seal feeders is used between the catalyst regenerator and the reactant conduit.

From the foregoing description it will be apparent that various features of my invention may be used either separately or conjointly. It will also be apparent to those skilled in the art that various obvious modifications may be made without departing from the spirit of my invention as set forth in the following claims.

Having described my invention, I claim:

1. In an apparatus for the continuous catalytic conversion of hydrocarbons at elevated pressures, comprising a reaction chamber, a catalyst stripping chamber and a catalyst regenerating chamber interconnected, an improved catalyst stripping chamber for the separation of the reaction products from the catalyst which comprises a vertical chamber, a cyclone separator positioned in an upper portion of said chamber, a gas discharge conduit from said separator, a conduit from a lower portion of the reaction chamber to an upper portion of said stripping chamber, a catalyst discharge outlet in the lower portion of said stripping chamber, a conduit from the upper portion of the reaction chamber to the lower portion of the stripping chamber and extending into said stripping chamber to a level higher than the catalyst discharge outlet for delivering hot reaction gases into the catalyst stripping chamber in contact with the descending catalyst particles.

2. A liquid phase, catalytic cracking apparatus which comprises, in combination, a high-pressure reactor, a catalyst stripping chamber, a conduit leading from a lower portion of said reactor to an upper portion of said stripping chamber, a gas conduit leading from the top of said reactor into a lower portion of said stripping chamber, a gas outlet in an upper portion of said stripping chamber, a gas inlet in the lower portion of said stripping chamber, a catalyst regeneration chamber, a conduit leading from a lower portion of said stripping chamber to an upper portion of said regeneration chamber, a gas inlet in the bottom and a gas outlet in the top of said regeneration chamber, a reactant feed line leading into an intermediate portion of said reactor, and a conduit leading from the bottom of said regeneration chamber to said reactant feed line.

3. A liquid-phase catalytic cracking apparatus which comprises an elongated, upright high-pressure reaction chamber, a reactant feed line into said chamber at a point intermediate the ends, a catalyst stripping chamber positioned above said reaction chamber, a conduit leading from the bottom of said reaction chamber to an upper portion of said stripping chamber, a gas removal means in said stripping chamber comprising a cyclone separator having a gas outlet to the outside and a dip-leg extending to a lower portion of said stripping chamber, a gas conduit leading from an upper portion of said reaction chamber to a lower portion of said stripping chamber, a second gas inlet in the bottom of said stripping chamber, a catalyst regenerating chamber positioned below said stripping chamber, a conduit leading from a lower portion of said stripping chamber to an upper portion of said regenerating chamber, a gas inlet in a lower portion and a gas outlet in an upper portion of said regenerating chamber, a catalyst transfer conduit leading from a lower portion of said regenerating chamber to said reactant feed line, and means in said feed line to heat the reactants to the reaction temperature.

4. An apparatus for a liquid-phase cracking process which comprises, in combination, a high-pressure reactor, a reactant feed line leading to a middle portion of said reactor, a flash chamber positioned above said reactor, a gas conduit leading from an upper portion of said reactor to a lower portion of said flash chamber having a flow-control valve therein, a conduit from a lower portion of said reactor to an upper portion of said flash chamber having a flow-control valve therein, a gas outlet in an upper portion of said chamber, a separator in said flash chamber at the gas outlet for removing solids from the gaseous effluent, a catalyst regeneration chamber positioned below said flash chamber, a catalyst conduit from a lower portion of said flash chamber to an upper portion of said regeneration chamber, a gas inlet adjacent the bottom and a gas outlet in an upper portion of said flash chamber, a separator in said regeneration chamber at the gas outlet for removing solids from the gaseous effluent, a ctalyst conduit from the bottom of said regeneration chamber to said reactant feed line, and means in said feed line to deliver reactants and catalyst to said reaction chamber at an elevated pressure.

5. An apparatus for a liquid-phase cracking process which comprises, in combination, a high-pressure reactor, a reactant feed line leading to a middle portion of said reactor, a flash chamber positioned above said reactor, a gas conduit leading from an upper portion of said reactor to a lower portion of said flash chamber having a flow-control valve therein, a conduit from a lower portion of said reactor to an upper portion of said flash chamber having a flow-control valve therein, a gas outlet in an upper portion of said chamber, a separator in said flash chamber at the gas outlet for removing solids from the gaseous effluent, a catalyst regeneration chamber positioned below said flash chamber, a catalyst conduit from a lower portion of said flash chamber to an upper portion of said regeneration chamber, a gas inlet in the bottom and a gas outlet in an upper portion of said flash chamber, a separator in said regeneration chamber at the gas outlet for removing solids from the gaseous effluent, a catalyst seal-feeder device disposed below said regeneration chamber comprising a pair of pressure-tight containers, and means for pressurizing same, a branched catalyst conduit leading from said regeneration chamber to each of said containers, a catalyst cooler in the unbranched portion of said branched conduit, means for alternating the flow of catalyst into said containers, a catalyst conduit from said feeders to said reactant feed line, flow-control means in said catalyst conduit to said reactant feed line to control the flow therethrough, and means to deliver reactants to said reaction chamber at an elevated pressure.

6. The method of conducting a high pressure, substantially liquid phase, hydrocarbon conversion employing a moving particulate catalyst which during the conversion adsorbs a substantial quantity of hydrocarbon in the liquid phase which must be removed before a desirable regeneration of said catalyst can be effected which comprises maintaining said hydrocarbon and catalyst in a conversion zone under a pressure sufficient to maintain a body of hydrocarbon liquid in admixture with said catalyst in said zone; effecting a desired conversion in said zone; removing the admixture after vaporization of converted hydrocarbon therefrom from a low point of said conversion zone into an intermediate point of a separate stripping zone maintained under a pressure substantially lower than the pressure in said conversion zone while introducing hydrocarbon gases and vapors from above said body of liquid in said conversion zone into the lower portion of said stripping zone; withdrawing the converted hydrocarbon from the top of the stripping zone; maintaining a level of stripped catalyst in the bottom of said stripping zone; withdrawing for regeneration said catalyst from said stripping zone at a point lower than said point in said stripping zone at which the said gases and vapors are introduced; regenerating said catalyst from said stripping zone in a separate regeneration zone and returning the regenerated catalyst to an intermediate portion of said conversion zone.

JOHN W. LOY.

REFERENCES CITED

The following references are of record in the file of this patent:

UNITED STATES PATENTS

| Number | Name | Date |
|---|---|---|
| 2,259,487 | Payne | Oct. 21, 1941 |
| 2,273,075 | Weems | Feb. 17, 1942 |
| 2,302,209 | Goddin | Nov. 17, 1942 |
| 2,308,557 | Watson | Jan. 19, 1943 |
| 2,326,705 | Thiele | Aug. 10, 1943 |
| 2,342,984 | Thomas | Feb. 29, 1944 |
| 2,393,909 | Johnson | Jan. 29, 1946 |